J. RICHARDS & G. BATES.
TRANSMISSION GEARING.
APPLICATION FILED JAN. 17, 1910.

994,199.

Patented June 6, 1911.

Witnesses —

Inventors
John Richards
George Bates.
by
Attorney.

UNITED STATES PATENT OFFICE.

JOHN RICHARDS AND GEORGE BATES, OF LONDON, ENGLAND.

TRANSMISSION-GEARING.

994,199.  Specification of Letters Patent.  Patented June 6, 1911.

Application filed January 17, 1910. Serial No. 538,456.

*To all whom it may concern:*

Be it known that we, JOHN RICHARDS, a subject of the King of Great Britain and Ireland, residing at 17 Brunswick Square, Camberwell, London, S. E., and GEORGE BATES, a subject of the King of Great Britain and Ireland, residing at 139 Junction road, Upper Holloway, London, N., England, have invented a certain new and useful Transmission-Gearing, of which the following is a specification.

This invention relates to a transmission gearing for transmitting power from any kind of engine or other source of power and more particularly for the transmission of power from internal-combustion engines, such power being transmitted with a minimum amount of loss of power, shock and of vibration due to the uneven turning moment of the engine.

According to the invention the driving member is provided to carry the planet pinions of a bevel or spur wheel epicylic gearing and is mounted coaxially with the driven member which has secured upon it a pinion, engaging the said planet pinions. A second pinion or internally toothed wheel which also engages the planet pinions is loosely carried coaxially with the driving and driven members and is connected with the driven member by a spiral spring wound around a cylindrical surface provided upon the driven member.

The invention is illustrated by way of example in the accompanying drawings which represent—

Figures 1, 2:
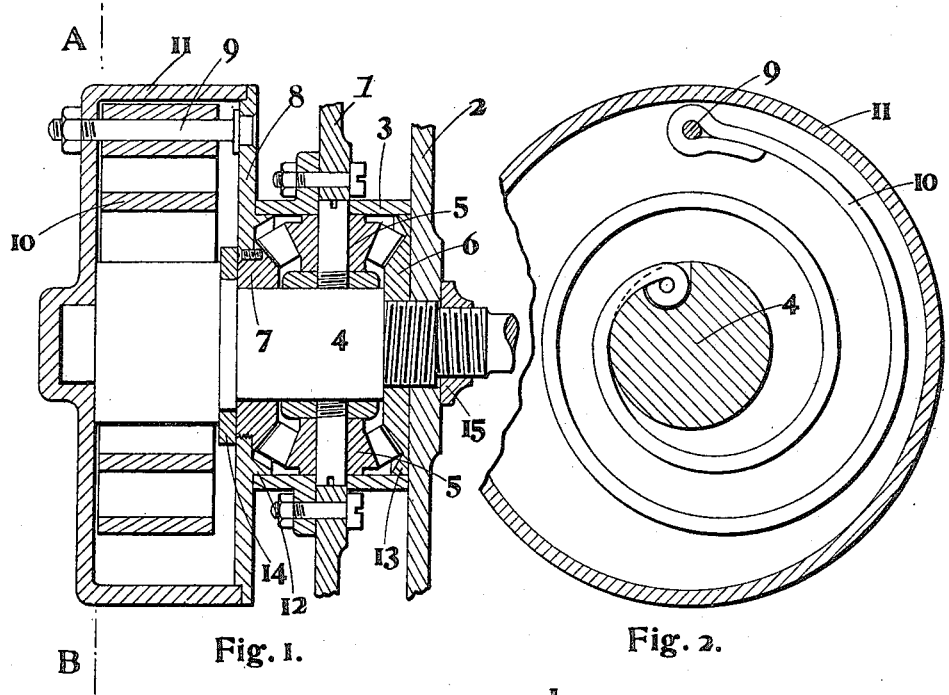
Figure 3:
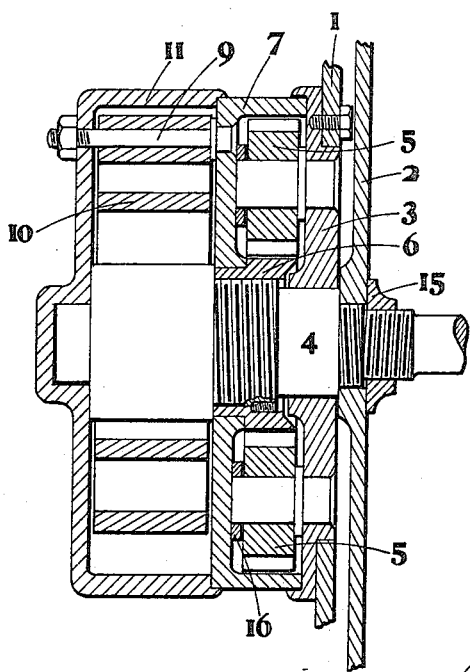

Figure 1 a sectional elevation of a transmission gearing in which chain wheels or pulleys are employed for the driving and the driven members and the epicylic gearing is of the bevel type. Fig. 2 a cross-section of the spring casing taken on the line A B Fig. 1, showing the spring. Fig. 3, a sectional elevation of a transmission gearing provided with spur wheel epicyclic gearing and chain wheel or pulley driving and driven members.

In carrying the invention into effect as applied in the construction shown in Figs. 1 and 2 the driving member is mounted loosely upon the short shaft 4 and carries the planet pinions 5 of the epicyclic gearing. It is preferably provided as two concentric rings, or a rim and boss, connected together by an integrally formed web in which apertures are made in diametrically opposite positions for the reception of the pinions 5 which are loosely mounted upon radially disposed spindles secured in the concentric rings. The outer ring 3 is provided with a flange to which the chain wheel or pulley 1 is secured. Upon the shaft 4 at one side of the driving member are secured a bevel pinion 6 and the driven chain wheel or pulley 2 and, at the other side of the driving member, the shaft carries loosely mounted upon it a bevel wheel 7 to which is secured the spring casing formed by the disk 8 and the case 11. The spring 10 is secured at one extremity to the pin 9, which is fixedly secured across the spring casing, and after being coiled about the shaft is secured thereto at its other extremity in any suitable way. By this means the bevel pinions 6 and 7 are connected to one another by a flexible connection.

It is preferable that a ring or collar 14 should be mounted upon the shaft 4 to take up the end thrust of the pinion 7, and projecting rings 12 and 13 are advantageously provided respectively upon the disk 8 and wheel or pulley 2 to loosely fit within the outer ring of the driving member and so prevent the entry of dust and dirt into the gearing. A lock nut 15 is provided for securing the driven wheel or pulley 2 in position upon the shaft.

The wheel or pulley 1 receives the power, say from an internal-combustion engine, and this power is transmitted to the planet pinions 5, which being free to revolve upon their spindles transmit the power equally to the pinions 6 and 7. The pinion 6 remains stationary since it is connected to the driven member upon which the load is applied, while the pinion 7 yields to the pressure exerted upon it and revolves forward relatively to the pinion 6 and in doing so winds up the spring 10 until the stored energy in the spring becomes sufficient to hold the pinion 6 against the load on the wheel 2. The whole of the transmission gearing would then revolve as one upon its axis. At a moment when the turning moment of the engine is decreased the spring 10 would begin to give out the stored energy by unwinding and would tend to bring the pinion 7 back to its initial position relatively to the pinion 6.

According to the construction shown in Fig. 3 the epicyclic gearing employed is of the spur wheel type of which the pinion 6 is secured to the shaft 4 and is adapted to engage with the planet pinions 5 which are carried upon spindles secured to a plate or disk 3 which is mounted loosely upon the shaft 4 and has secured to it the driving chain wheel or pulley 1. The pinions 5 may be retained in their respective positions upon their spindles by means of a ring 16 secured to the outer extremities of the spindles. The pinion 7 is provided as an internally toothed wheel carried loosely upon the boss of the pinion 6 or upon the shaft 4 and is adapted to form one side of the spring casing 11.

When the driving and driven members are provided as co-axial shafts the driving shaft has securely mounted upon it the planet pinion carrier and the pinion 7 is loosely mounted upon the driving shaft and secured to the spring casing, while the pinion 6 to which the one end of the spring is secured is fixedly mounted upon the extremity of the driven shaft and is adapted also to form a bearing for the extremity of the driving shaft. If, however, spur gearing is used the pinion 7 is mounted loosely upon the boss of the pinion 6.

It will be understood that the invention is not limited to the particular constructional details described. Any form of dust cap may be provided for the protection of the gearing, and any form of bearing may be used, and further the lubrication of the device may be carried out in any manner without departing from the spirit of the invention.

What we claim as our invention and desire to secure by Letters Patent is:—

1. Transmission gearing comprising a driving member, a driven shaft, a driven member, gearing between the driven member and the driving member comprising gear wheels, a disk, a casing, a pin fixed to the disk, and a spring secured to the driven shaft and to the pin.

2. Transmission gearing comprising a driving member, a driven shaft, a driven member, gearing between the driven member and the driving member comprising gear wheels, a disk, a casing, a pin fixed to the disk and a spring secured to the driven shaft and to the pin, and means adapted to prevent the entry of dust into the gearing.

3. Transmission gearing comprising a driving member, a driven shaft, a driven member, gearing between the driven member and the driving member comprising gear wheels, a disk, a casing, a pin fixed to the disk, a spring secured to the driven shaft and to the pin, and means adapted to take up the end thrust.

4. Transmission gearing comprising a driving member, a driven shaft, a driven member, gearing between the driven member and the driving member comprising gear wheels, a disk, a casing, a pin fixed to the disk and a spring secured to the driven shaft and to the pin, and means adapted to prevent the entry of dust into the gearing, and means adapted to take up the end thrust.

In testimony whereof we have hereunto signed our names to this specification in the presence of two subscribing witnesses.

JOHN RICHARDS.
GEORGE BATES.

Witnesses:
LIONEL ERNEST BUSSEY,
FREDERICK ERNEST SQUIRE.